US011054894B2

(12) United States Patent
Pahud et al.

(10) Patent No.: US 11,054,894 B2
(45) Date of Patent: Jul. 6, 2021

(54) INTEGRATED MIXED-INPUT SYSTEM

(71) Applicant: MICROSOFT TECHNOLOGY LICENSING, LLC, Redmond, WA (US)

(72) Inventors: Michel Pahud, Kirkland, WA (US); Eyal Ofek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 15/640,263

(22) Filed: Jun. 30, 2017

(65) Prior Publication Data
US 2018/0321737 A1 Nov. 8, 2018

Related U.S. Application Data

(60) Provisional application No. 62/501,961, filed on May 5, 2017.

(51) Int. Cl.
*G06F 3/048* (2013.01)
*G06F 3/01* (2006.01)
(Continued)

(52) U.S. Cl.
CPC .............. *G06F 3/011* (2013.01); *G06F 3/013* (2013.01); *G06F 3/016* (2013.01); *G06F 3/0346* (2013.01);
(Continued)

(58) Field of Classification Search
CPC ...... G06F 3/011; G06F 3/016; G06F 3/04886; G06F 3/0346; G06F 3/048; G06F 3/013;
(Continued)

(56) References Cited

U.S. PATENT DOCUMENTS 7,023,979 B1  4/2006  Wu et al.
7,589,747 B2  9/2009  Matsui et al.
(Continued)

FOREIGN PATENT DOCUMENTS

CN   1716193 A    1/2006
CN   101950237 A  1/2011
(Continued)

OTHER PUBLICATIONS

"Pre-Touch Sensing for Mobile Interaction", https://youtu.be/fiZkEYLXctE, Published on: Dec. 9, 2016, 4 pages.
(Continued)

*Primary Examiner* — Jonathan A Boyd
(74) *Attorney, Agent, or Firm* — Shook, Hardy & Bacon L.L.P.

(57) ABSTRACT

In various embodiments, methods and systems for implementing an integrated mixed-input system are provided. The integrated mixed-input system includes paired mixed-input devices for interacting and controlling virtual space input interfaces using real inputs and virtual inputs, sensors, and passive and active haptic feedback associated with the paired mixed-input devices. Real device space tracker data and virtual device space tracker data are accessed via the paired mixed-input devices to determine real input and virtual input that are processed to determine virtual space input. The real device space tracker data and virtual device space tracker data also are used to generate different interaction contexts. In one embodiment, integrated mixed-input system supports interface deviation, where a physical mixed-input device interface is a different size from a size of the virtual space input interface. The virtual space input is communicated to control the virtual space input interface.

20 Claims, 13 Drawing Sheets

(51) Int. Cl.
*G06T 3/20* (2006.01)
*G06F 3/0346* (2013.01)
*G06F 3/0488* (2013.01)
*G06F 3/0484* (2013.01)

(52) U.S. Cl.
CPC ............... *G06F 3/048* (2013.01); *G06T 3/20* (2013.01); *G06F 3/04842* (2013.01); *G06F 3/04886* (2013.01)

(58) Field of Classification Search
CPC ...... G06F 3/04842; G06F 3/017; G06F 1/163; G06F 3/0304; G06F 3/0426; G06T 3/20
See application file for complete search history.

(56) References Cited

U.S. PATENT DOCUMENTS

| | | | |
|---|---|---|---|
| 7,953,865 | B1 | 5/2011 | Miller et al. |
| 8,502,780 | B1 | 8/2013 | Park |
| 8,856,948 | B1 | 10/2014 | Robison et al. |
| 8,958,158 | B1 | 2/2015 | Raffle et al. |
| 9,102,055 | B1 | 8/2015 | Konolige et al. |
| 9,292,184 | B2 | 3/2016 | Hosenpud et al. |
| 9,330,478 | B2 | 5/2016 | Anderson |
| 9,349,218 | B2 | 5/2016 | Keating et al. |
| 9,449,444 | B2 | 9/2016 | Kim et al. |
| 9,459,706 | B2 | 10/2016 | Kamba et al. |
| 9,466,266 | B2 | 10/2016 | Hildreth et al. |
| 9,497,309 | B2 | 11/2016 | Raghavan |
| 9,503,681 | B1 | 11/2016 | Popescu et al. |
| 9,536,067 | B1 | 1/2017 | Lee |
| 9,582,712 | B2 | 2/2017 | Park et al. |
| 9,679,538 | B2 | 6/2017 | Holmanu |
| 9,690,763 | B1 | 6/2017 | Lee |
| 9,760,790 | B2 | 9/2017 | Novak |
| 9,766,462 | B1 | 9/2017 | Worley et al. |
| 9,832,187 | B2 | 11/2017 | Faaborg et al. |
| 9,864,495 | B2 | 1/2018 | Hosenpud et al. |
| 10,001,645 | B2 | 6/2018 | Norden |
| 10,147,243 | B2 | 12/2018 | Yamamoto et al. |
| 10,235,809 | B2 | 3/2019 | Evans |
| 10,311,249 | B2 | 6/2019 | Sharifi et al. |
| 10,338,673 | B2 | 7/2019 | Chen et al. |
| 10,467,814 | B2 | 11/2019 | Loberg et al. |
| 2003/0020707 | A1 | 1/2003 | Kangas et al. |
| 2009/0066690 | A1 | 3/2009 | Harrison |
| 2009/0128552 | A1 | 5/2009 | Fujiki et al. |
| 2010/0295921 | A1 | 11/2010 | Guthrie et al. |
| 2012/0038637 | A1 | 2/2012 | Marks |
| 2012/0212509 | A1 | 8/2012 | Benko et al. |
| 2012/0249416 | A1 | 10/2012 | Maciocci et al. |
| 2012/0249587 | A1 | 10/2012 | Anderson et al. |
| 2012/0302289 | A1 | 11/2012 | Kang |
| 2013/0009950 | A1 | 1/2013 | Ben-David et al. |
| 2013/0047103 | A1 | 2/2013 | Avisar |
| 2013/0073681 | A1 | 3/2013 | Jiang et al. |
| 2013/0194164 | A1 | 8/2013 | Sugden et al. |
| 2013/0207963 | A1 | 8/2013 | Stirbu et al. |
| 2013/0314421 | A1 | 11/2013 | Kim |
| 2013/0326364 | A1 | 12/2013 | Latta et al. |
| 2013/0328925 | A1 | 12/2013 | Latta et al. |
| 2014/0002493 | A1 | 1/2014 | Mitchell et al. |
| 2014/0053090 | A1 | 2/2014 | Lu et al. |
| 2014/0267049 | A1 | 9/2014 | Durham et al. |
| 2014/0267599 | A1 | 9/2014 | Drouin et al. |
| 2014/0300547 | A1 | 10/2014 | Hosenpud et al. |
| 2014/0310595 | A1 | 10/2014 | Acharya et al. |
| 2015/0002434 | A1 | 1/2015 | Tsukahara et al. |
| 2015/0049084 | A1 | 2/2015 | Cheng et al. |
| 2015/0121287 | A1 | 4/2015 | Fermon |
| 2015/0170539 | A1 | 6/2015 | Chica Barrera et al. |
| 2015/0185825 | A1 | 7/2015 | Mullins |
| 2015/0243086 | A1 | 8/2015 | Denis et al. |
| 2015/0268821 | A1 | 9/2015 | Ramsby et al. |
| 2015/0363647 | A1 | 12/2015 | Perez et al. |
| 2016/0018985 | A1 | 1/2016 | Bennet et al. |
| 2016/0054791 | A1* | 2/2016 | Mullins .................. G04G 21/00 345/173 |
| 2016/0063762 | A1 | 3/2016 | Heuvel et al. |
| 2016/0093078 | A1 | 3/2016 | Davis et al. |
| 2016/0202876 | A1 | 7/2016 | Hosenpud et al. |
| 2016/0223986 | A1 | 8/2016 | Archambeau et al. |
| 2016/0291699 | A1 | 10/2016 | Katz et al. |
| 2016/0307357 | A1 | 10/2016 | Vats et al. |
| 2016/0321841 | A1 | 11/2016 | Christen et al. |
| 2017/0018120 | A1 | 1/2017 | Li et al. |
| 2017/0038830 | A1 | 2/2017 | Clement et al. |
| 2017/0064240 | A1 | 3/2017 | Mangat et al. |
| 2017/0076502 | A1* | 3/2017 | Chen .................. G06K 9/00362 |
| 2018/0005439 | A1 | 1/2018 | Evans |
| 2019/0004683 | A1 | 1/2019 | Pahud et al. |
| 2019/0004684 | A1 | 1/2019 | Pahud et al. |
| 2019/0034076 | A1 | 1/2019 | Vinayak et al. |
| 2019/0180506 | A1 | 6/2019 | Gebbie et al. |
| 2019/0213796 | A1 | 7/2019 | Evans |

FOREIGN PATENT DOCUMENTS

| | | |
|---|---|---|
| CN | 102707882 A | 10/2012 |
| CN | 102905182 A | 1/2013 |
| DE | 102013021978 A1 | 8/2014 |
| EP | 2983140 A1 | 2/2016 |
| EP | 3479338 A1 | 5/2019 |
| WO | 2014171200 A1 | 10/2014 |
| WO | 2016118606 A1 | 7/2016 |

OTHER PUBLICATIONS

"Final Office Action Issued in U.S. Appl. No. 15/640,363", dated Oct. 1, 2020, 24 Pages.
"Non-Final Office Action Issued in U.S. Appl. No. 15/640,361", dated May 15, 2020, 16 Pages.
"Forget the Scan: Groundbreaking New System Could Allow Mothers to See a Live Hologram of their Baby in the Womb—and Let Surgeons Manipulate Virtual Organs as they Operate", Retrieved From: www.dailymail.co.uk/sciencetech/article-2848010/Forget-scan-Groundbreaking-new-allow-mothers-live-Hologram-baby-womb-let-surgeons-organs-operate.html, Dec. 20, 2016, 6 Pages.
"Wacom for Capturing Ideas Annotation", Retrieved From: https://web.archive.org/web/20151127151339/https://www.wacom.com/en-us/discover/capture-ideas/annotation, Retrieved on: Nov. 27, 2015, 1 Page.
"Final Office Action Issued in U.S. Appl. No. 15/640,361", dated Sep. 6, 2019, 13 Pages.
"Non Final Office Action Issued in U.S. Appl. No. 15/640,361", dated May 3, 2019, 12 Pages.
"Non Final Office Action Issued in U.S. Appl. No. 15/640,361", dated Jan. 3, 2020, 15 Pages.
"Final Office Action Issued in U.S. Appl. No. 15/640,363", dated Nov. 29, 2019, 16 pages.
"Non Final Office Action Issued in U.S. Appl. No. 15/640,363", dated Jul. 26, 2019, 17 Pages.
"Non-Final Office Action Issued in U.S. Appl. No. 15/640,363", dated Mar. 19, 2020, 20 Pages.
Bimber, et al., "Spatial Augmented Reality Merging Real and Virtual Worlds", in Publication of A K Peters Ltd, 2005, 393 Pages.
Fiorentino, et al., "Tangible Interfaces for Augmented Engineering Data Management", in Publication of Intech, Jan. 2010, pp. 113-128.
Hoang, et al., "Augmented Reality in-situ 3D Model Menu for Outdoors", in Proceedings of the 7th IEEE/ACM International Symposium on Mixed and Augmented Reality, Sep. 15, 2008, pp. 185-186.
Laviole, Jeremy, "Spatial Augmented Reality for Physical Drawing", in Thesis of University of Bordeaux, Dec. 5, 2013, 103 Pages.
Nuernberger, et al., "SnapToReality: Aligning Augmented Reality to the Real World", in Proceedings of the CHI Conference on Human Factors in Computing Systems, May 7, 2016, pp. 1233-1244.

(56) References Cited

OTHER PUBLICATIONS

"International Search Report and Written Opinion Issued in PCT Application No. PCT/US18/034508", dated Aug. 7, 2018, 12 Pages.
"International Search Report and Written Opinion Issued in PCT Application No. PCT/US18/034509", dated Aug. 7, 2018, 12 Pages.
Sing, et al., "Garden: A Mixed Reality Experience Combining Virtual Reality and 3D Reconstruction", in Proceedings of the CHI Conference Extended Abstracts on Human Factors in Computing Systems, May 7, 2016, pp. 180-183.
"Final Office Action Issued in U.S. Appl. No. 15/199,297", dated May 30, 2018, 17 Pages.
"Non-Final Office Action Issued in U.S. Appl. No. 15/199,297", dated Nov. 13, 2017, 16 Pages.
"Notice of Allowance Issued in U.S. Appl. No. 15/640,363", dated Jan. 27, 2021, 6 Pages.
"Non-Final Office Action Issued in U.S. Appl. No. 16/357,138", dated Apr. 9, 2020, 9 Pages.
"Office Action Issued in European Patent Application No. 17733241.8", dated Feb. 24, 2020, 7 Pages.
Amores, et al., "Smart Avatars: Using Avatars to Interact with Objects", in Proceedings of SIGCHI Conference on Human Factors in Computing Systems, May 5, 2012, 3 pages.
Breen, et al., "Interactive Occlusion and Collision of Real and Virtual Objects in Augmented Reality", In Technical Report ECRC-95-02 of European Computer-Industry Research Centre GmbH, Aug. 6, 1995, 22 pages.
Lok, et al., "Effects of Handling Real Objects and Avatar Fidelity on Cognitive Task Performance in Virtual Environments", in Proceedings of IEEE Virtual Reality, Mar. 22, 2003, 8 pages.
Lok, et al., "Incorporating Dynamic Real Objects into Immersive Virtual Environments", In Proceedings of Symposium on Interactive 3D Graphic, Oct. 24, 2002, pp. 1-11.
"International Search Report and Written Opinion Issued in PCT Application No. PCT/US2017/037102", dated Aug. 17, 2017, 11 Pages.
Popovski, et al., "Generating 3D Model in Virtual Reality and Analyzing Its Performance", In International Journal of Computer Science & Information Technology, vol. 6, No. 6, Dec. 2014, pp. 123-128.
Wesugi, et al., ""Dual" Embodied Interaction for Creating a Virtual Co-existing Space", In Proceedings of 6th Annual International Workshop on Presence, Oct. 6, 2003, 4 Pages.
"Office Action Issued in European Patent Application No. 18731666.6", dated Feb. 8, 2021, 6 Pages.
"Office Action Issued in European Patent Application No. 18731665.8", dated Feb. 8, 2021, 6 Pages.
"Summons to Attend Oral Proceedings Issued in European Patent Application No. 17733241.8", dated Mar. 31, 2021, 8 Pages.
"First Office Action and Search Report Issued in Chinese Patent Application No. 201780041262.4", dated Apr. 6, 2021, 15 Pages.

\* cited by examiner

INTEGRATED MIXED-INPUT SYSTEM

CROSS-REFERENCE TO RELATED APPLICATIONS

This application claims priority to U.S. Provisional Application Ser. No. 62/501,961, filed May 5, 2017, entitled "INTEGRATED MIXED-INPUT SYSTEM," which is incorporated herein by reference in its entirety.

BACKGROUND

Computing systems (e.g., virtual reality or augmented reality devices) receive input from input devices to control input interfaces for objects in virtual environments and augmented reality environments (i.e., collectively virtual experiences). For example, a virtual reality controller can be used to detect user hand motion in a virtual experience and the hand motion is communicated to a computing system of the virtual experience. The computing system then typically translates the input to interface controls or actions, such as, interface selections or data entry. Input devices in virtual experiences can control input interfaces that are defined in virtual space (e.g., floating interfaces). A floating interface provides a point of interaction generated in virtual space as part of a virtual experience. An input can be received via a corresponding computing system (e.g., a head-mounted display) associated with the floating interface to interact with the floating interface. As such, input devices and virtual space input interfaces are an integral part of interacting with virtual experience computing systems to communicate interface controls.

SUMMARY

Embodiments of the present invention are directed to an integrated mixed-input system. The integrated mixed-input system includes paired mixed-input devices for interacting and controlling virtual space input interfaces using real inputs and virtual inputs, sensors, and passive and active haptic feedback associated with the paired mixed-input devices. Real device space tracker data and virtual device space tracker data is accessed via the paired mixed-input devices, respectively, to determine real input and virtual input that are integrated and processed to determine virtual space input. The real device space tracker data and virtual device space tracker data are also used to generate different interaction contexts for determining virtual space input. In one embodiment, the integrated mixed-input system supports interface deviation, where a physical mixed-input device interface is a different size from a size of the virtual space input interface (e.g., a physical mixed-input device interface is a first interface size which is smaller than a second interface size of a virtual space input interface).

In operation, real input is determined based on real device space tracker data associated with a physical mixed-input device. Virtual input is also determined based on virtual device space tracker data associated with a virtual mixed-input device. The physical mixed-input device interface of the physical mixed-input device has a first interface size which is smaller than a second interface size. A virtual space input interface has the second interface size which is larger. The virtual space input interface is dynamically shifted, such that, a target input portion of the virtual space input interface overlaps with the physical mixed-input device interface to receive the real input. The virtual space input is determined based on the real input and the virtual input in an interaction context. The virtual space input is communicated to control the virtual space input interface.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
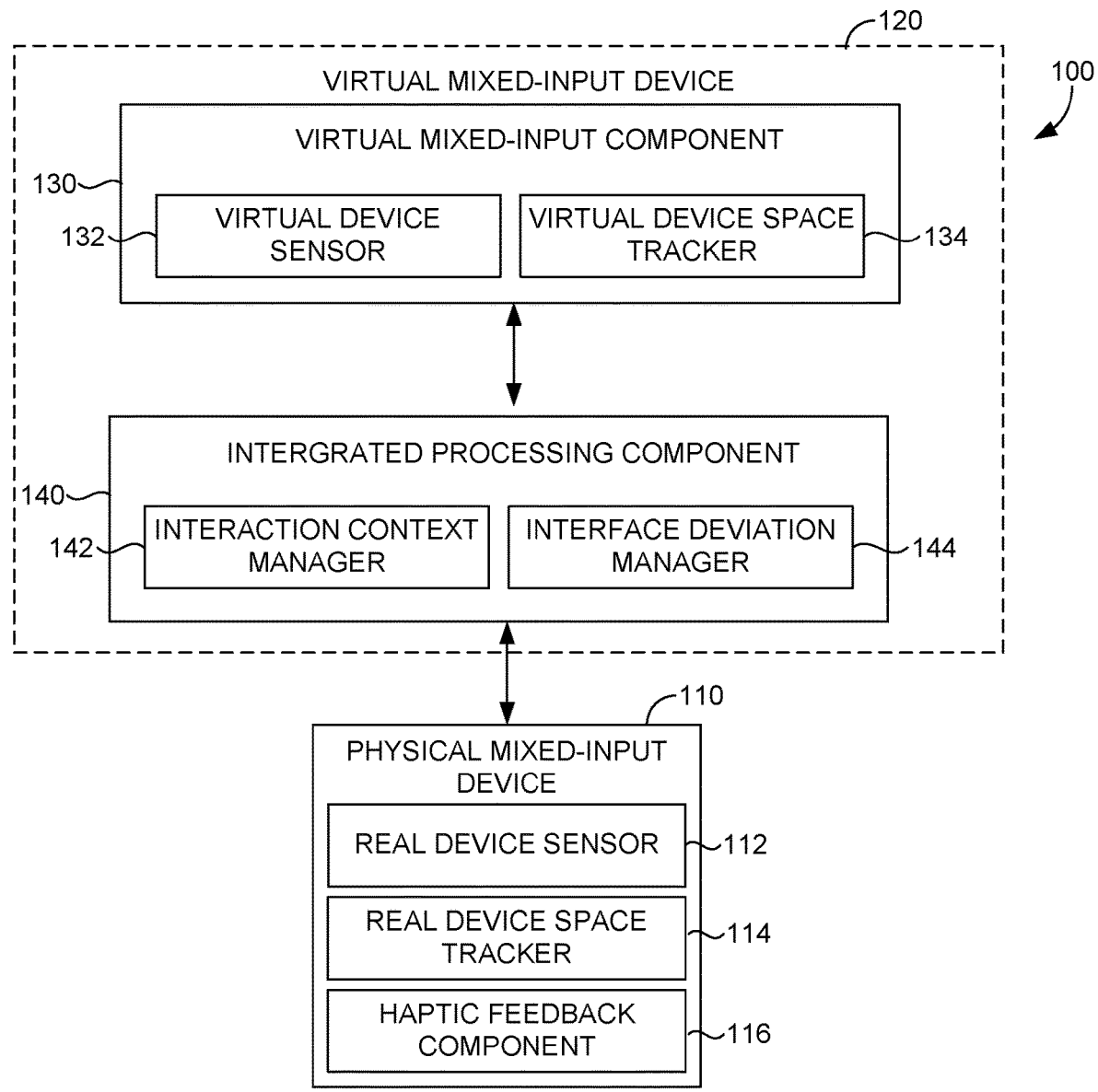
FIG. 1 is a schematic showing an exemplary integrated mixed-input system, in accordance with embodiments of the present invention.

Computing systems (e.g., virtual reality or augmented reality devices) receive input from input devices to control input interfaces for objects in virtual environments and augmented reality environments (i.e., collectively virtual experiences). An input device can refer to a peripheral used to provide data and control signals for processing via an input processing system of a virtual experience device (e.g., head mounted display device). Virtual experiences (e.g., immersive game or other multidimensional experiences) use different types of input devices. For example, a virtual reality controller can be used to detect user hand motion in a virtual experience and the hand motion is communicated to a computing system (e.g., a head-mounted display) of the virtual experience. The computing system then typically translates the detected hand motion to input for interface controls or actions, such as, interface selections or data entry. Input devices in virtual experiences can control input interfaces that are defined in virtual space (e.g., virtual space input interfaces or floating interfaces). A virtual space input interface provides a point of interaction generated in virtual space as part of a virtual experience to determine and communicate inputs from the user to a corresponding computing system associated with the virtual space input interface. Floating interfaces can include virtual space input interface panels with selectable objects and also specifically include virtually generated screens, keyboards and keypads, amongst other types of objects. As such, input devices and virtual space input interfaces or floating interfaces are an integral part of interacting with virtual experience computing systems to communicate interface controls.

With conventional virtual reality systems, the experience and sensation of full immersion can be diminished because of a lack of haptic feedback. Haptic feedback can generally refer to the sense of touch when contacting (e.g., with a finger a hand) a surface. Haptic feedback can be passive haptic feedback, that is, the sense of touch inertly provided from physical object by touching physical objects. Haptic feedback can be active haptic feedback that includes kinesthetic communications that recreate the sense of touch by applying forces, vibrations, or motions to a user interacting with physical or virtual objects. Lack of haptic feedback frequently occurs with virtual space input interfaces (e.g., floating interfaces). For example, when a user is attempting to interact with a virtual keypad in a virtual experience, the experience is unlike the real world where the user feels a touch sensation when touching a keypad (e.g., a keypad on a wall). Moreover, user motion (e.g., hand motion) for providing user input where the expected sense of touch is absent can cause fatigue in the user experience in that the user's hands can become tired. In addition, the user may already have their hands actively operating other HMD device input controllers (e.g., a nunchuk-type controller) that make it difficult to further operate virtual input devices. In this regard, the user lacks flexibility and the lack of touch sensation can be exacerbated.

Embodiments of the present inventions provide simple and efficient methods and systems for integrated real input and virtual input. In embodiments, an integrated real input and virtual input system ("integrated mixed-input system") includes paired mixed-input devices for interacting and controlling virtual space input interfaces using several components of a computing system (e.g., a virtual experience device). The integrated mixed-input system includes paired mixed-input devices for interacting and controlling virtual space input interfaces using real inputs and virtual inputs, sensors, and passive and active haptic feedback associated with the paired mixed-input devices. A mixed-input device can refer to a device that is used to track movement data in a real space or track movement data in virtual space. The combination of the real device space tracker data and virtual device space tracker data can be captured, integrated and processed to control virtual space input interfaces. Real device space tracker data and virtual device space tracker data is accessed via paired mixed-input devices (e.g., a mobile phone or tablet paired to a head-mounted display) to determine real input and virtual input that are integrated and processed to determine virtual space input. The real device space tracker data and virtual device space tracker data can also be used to generate different interaction contexts for determining virtual space input. The virtual space input is determined based on a real input determined for the physical mixed-input device and the virtual input determined for a virtual mixed-input device, the real input corresponds to the virtual input for a virtual space input interface.

In one embodiment, the integrated mixed-input system supports interface deviation where a physical mixed-input device interface is a different size from a size of the virtual space input interface. For example, a physical mixed-input device interface of the physical mixed-input device has a first interface size which is smaller than a second interface size; the virtual space input interface of the virtual mixed-input device has the second interface size which is larger. The virtual space input interface is dynamically shifted, such that, a target input portion of the virtual space input interface overlaps with the physical mixed-input device interface to receive the real input. Alternatively, the user can dynamically shift the physical mixed-input device interface, such that, the target input portion of the virtual space input interface overlaps with the physical mixed-input device interface to receive the real input. The virtual space input is determined based on the real input and the virtual input in an interaction context. The virtual space input is communicated to interact with and control the virtual space input interface. Advantageously, the physical mixed-input device can provide passive or haptic feedback in an immersive virtual reality experience; the user experience aligns with customary sensation of touch when interacting with actual objects in the real world. In this regard, the immersive virtual experience feels more real without breaking the sensation of immersion.

Embodiments of the integrated mixed-input system can be described based on a specific exemplary implementation and corresponding components. The features of the embodiment described below are meant to be exemplary and not intended to limit the scope of the invention, unless otherwise stated. At a high level, the integrated mixed-input system leverages a display portion or touch screen of a smartphone, mobile device, tablet, or wearable device (i.e., a physical mixed-input device interface of a physical mixed-input device) as a haptic feedback accessory for supplementing a virtual experience with haptic feedback (e.g., passive or active haptic feedback). For example, a user may wear a smartphone on their wrist, such that, the touchscreen operates as a proxy virtual keypad (i.e., virtual mixed-input device interface) for a virtual keypad (i.e., virtual space input interface). The smartphone can be paired (e.g., in mixed-input mode) with a head-mounted display (HMD) device (i.e., a virtual mixed-input device) that generates the virtual keypad and proxy variations of the virtual keypad, as discussed in more detail herein. For example, the virtual keypad can be reproduced virtually on the smartphone touchscreen or regenerated as a floating interface. It is also possible that the virtual keypad is not reproduced and the smartphone touchscreen basically operates as a sensor surface in real space that is associated with receiving virtual input for the virtual keypad. It further possible that the smartphone specifically supports interactions and operations for an application running on the smartphone related to the virtual experience. The paired-mixed input devices can operate to detect, integrate and process movement data (e.g., real and virtual inputs from real device and virtual device space tracker data) to determine virtual space input for the virtual keypad while providing haptic feedback from the smartphone.

The user can participate in an immersive virtual experience that supports different types of interactions with the virtual keypad in combination with a natural interaction with the smartphone. The virtual experience can include several physical elements (e.g., dominant hand, non-dominant hand, smartphone, smartphone physical display (touchscreen) and smartphone display content) and corresponding virtual elements (e.g., virtual dominant hand (including a floating virtual dominant hand and a distant virtual dominant hand), a virtual representation of the smartphone, a virtual representation of the physical display of the smartphone, a virtual keypad regenerated at the smartphone, a floating virtual keypad and a distant virtual keypad).

Accordingly several different types of interaction contexts corresponding to virtual space input are possible based on a combination of different physical elements and virtual elements. Virtual space input is based on real input and virtual input corresponding to real device space tracker data and virtual device space tracker data. The combination of real input and the virtual input can be used to determine the virtual space input. In particular, real device space tracker data (e.g., finger motion, display or touchscreen input, smartphone orientation, etc.) can generally refer to data that is captured via the smartphone (i.e., physical mixed-input device) and virtual device space tracker data (e.g., hand motion, head motion, eye motion, physical mixed-input device orientation, etc.) can generally refer to data that is captured via the HMD device (i.e., virtual mixed-input device). Integrating and processing the real input and virtual input supports determining the virtual space input. The smartphone has several sensors that support tracking and the HMD device also has several sensors that support tracking to define real input and virtual input for determining virtual space input. It is further contemplated that the environment (e.g., a location or room) in which the interaction contexts are generated include sensors (e.g., location sensors). The location sensors can further be used in combination with the above mentioned sensors to generate real input and virtual input.

By way of example, based on tracking usage of the smartphone and the HMD device the following interaction contexts are possible for determining corresponding virtual space input. When the dominant hand is close to the smartphone attached to the wrist of the user, the virtual dominant hand can be rendered over the virtual representation of the smartphone. Also, when the dominant hand is close to the smartphone, the dominant hand can be redirected or generated as a distant virtual dominant hand to operate a distant virtual keypad at a distant location in the virtual experience. When the user brings their non-dominant hand close to a virtual keypad (e.g., walking up to a distant virtual keypad), the virtual representation of the physical display of the smartphone can include the virtual keypad regenerated at the smartphone. Further, when the dominant hand is next to the smartphone, a floating virtual keypad can be generated in front of the user.

Other interaction contexts can support initiating or triggering a mixed-input mode, selecting (e.g., gaze selection) a particular virtual space input interface. For example, there might be several virtual space input interfaces in a virtual experience such that gazing at a selected virtual keypad for a threshold amount of time automatically selects the virtual keypad and performs one or more other actions (e.g., audio feedback, haptic feedback, regenerating the virtual keypad for interaction).

In another interaction context, the user can select a set of characters of the virtual representation of the physical smartphone from a plurality of sets of characters (e.g., alphabet, numbers or symbols character sets). For example, the smartphone display (physically and virtually) can have a first set of characters or a second set of characters displayed based on a user selection. The first set of characters can be replaced with a second set of characters based on a virtual space input. The virtual space input derived from a real input and virtual input. In particular, the user performs a gesture that is captured as real input via the smartphone and the HMD device also captures a set of actions that in combination trigger changing the smartphone display from the first set of characters to the second set of characters.

In another example, with reference to interface deviation, where a physical mixed-input device interface is a different size from a size of the virtual mixed-input interface; in other words, the mapping from the size of the virtual keypad to the size of the smartphone is not 1:1, a size of the dominant hand can stay the same as the rest of the virtual experience or the size of the dominant hand can be temporarily rescaled so that it matches the proportions of the virtual representation of the smartphone display.

In addition, the proximity and orientation of the dominant hand and/or fingers that are extended could be used to understand the intent of the user and decide if a virtual keypad should be shown. For example, if the dominant hand is at a position proximate to the smartphone, but the index finger is not extended, then nothing happens. However, if the index finger is extended, the real input can be generated for the virtual keypad based on redirecting the virtual dominant hand or generating the virtual dominant hand over the smartphone. Moreover, the speed, acceleration and trajectory of the fingers toward the smartphone can be used to determine intent of the user.

In additional embodiments, the smartphone can include a hover sensor that determines more precise movement at close distances above the smartphone display. The smartphone can also include pressure sensors, in addition to or in the alternative, to supplement real inputs (e.g., allow a heads up positioning of the distant virtual hand interacting with the distant virtual keypad based on real input via the pressure sensors). In yet another example, the use of the smartphone sensors (e.g., gyro, accelerometer, and magnetometers) can support estimating the orientation of the non-dominant hand relative to a controller of the HMD device. Other variations and combinations of interactions contexts for real input and virtual input and determining virtual space input are contemplated with embodiments of the present invention.

With reference to FIG. 1, embodiments of the present disclosure can be discussed with reference to an exemplary integrated mixed-input system 100 that is an operating environment for implementing functionality described herein. The integrated mixed-input system 100 includes a physical mixed-input device 110, a virtual mixed-input device 120a virtual mixed-input component 130 and an integrated processing component 140. The physical mixed-input device 110 may include any type of computing device described below with reference to FIG. 12, (which further includes gyroscopes, accelerometers, magnetometers, hover sensors, structured light system etc.)

The virtual mixed-input device 120 can be a head mounted display ("HMD") VR device and may be any type of HMD virtual reality device or augmented reality device having one or more components of the HMD device described below with reference to FIGS. 10 and 11. For detailed discussion purposes, the virtual reality device is an exemplary head mounted display (HMD) device, but other types of virtual reality and augmented reality devices are contemplated with embodiments of the present disclosure. For example, the virtual reality HMD (e.g., SAMSUNG GEAR VR and OCULUS VR) can be a mobile virtual reality headset that provides virtual reality for the wearer. A VR headset can be used for computer games and applications, including simulators and trainers. Generally, the virtual reality headset can include a stereoscopic head mounted display (providing separate images for each eye), stereo sound, head and hand motion tracking sensors (which may include gyroscopes, accelerometers, magnetometers, cameras, structured light system etc.) VR headsets can also include eye tracking sensors and gaming controllers. The physical mixed-input device 110, a virtual mixed-input device 120 support implementing the integrated mixed-input system. A system as used herein refers to any device, process, or service or combination thereof. The system may be implemented using components as hardware, software, firmware, a special-purpose device, or any combination thereof. The system may be integrated into a single device or it may be distributed over multiple devices. The various components of the system may be co-located or distributed. The system may be formed from other systems and components thereof. The components of the integrated mixed-input system 100 facilitate generating virtual space input for virtual space input interfaces.

Having identified various components of integrated mixed-input system 100, it is noted that any number of components may be employed to achieve the desired functionality within the scope of the present disclosure. The various components of FIG. 1 are shown with lines for the sake of clarity. Further, although some components of FIG. 1 are depicted as single components, the depictions are exemplary in nature and in number and are not to be construed as limiting for all implementations of the present disclosure. Integrated mixed-input system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Turning to the additional components of FIG. 1, the physical mixed-input device 110 includes real device sensor 112, real device space tracker 114 and haptic feedback component 116; the virtual mixed-input device 120 includes the virtual mixed-input component 130 having the virtual device sensor 132 and virtual space tracker 134. The integrated processing component 140 includes interaction context manager 142 and interface deviation manager 144.

At a high level, the virtual mixed-input device 120 can operate to provide a virtual experience. The virtual experience can be an immersive experience that generates a virtual environment with virtual space input interfaces. The virtual mixed-input device 120 can include additional virtual input controllers (e.g., virtual input controller 280) and other sensors for tracking motion to make selections and inputs with the virtual experience. The virtual mixed-input device 120 can operate a virtual-mixed input component 130 for providing additional novel functionality associated with embodiments of the present disclosure.

The physical mixed-input device 110 supports generating real input for the integrated mixed-input system. The physical mixed-input device 110 operates with the real device sensor 112, real device space tracker 114 and the haptic feedback component 116 to provide the functionality described herein. The real device sensor 112 can be a type of sensor transmitting a signal associated with particular the type of sensor. The real device sensor 112 can also, in addition or in the alternative, operate as a component that accesses sensor data. Different types of sensor data are contemplated with reference the physical mixed-input device. Real device sensor 112 can specifically be associated with a wide angle sensor (e.g., camera) and a hover sensor for capturing different types of movement. The real device space tracker 114 can operate with sensor data to determine real input. The real device space tracker 114 is responsible for identifying and classifying different types of real device space information (e.g., finger motion, display or touchscreen input, smartphone orientation, etc.) which can be communicated as real input. Real input can refer to information gathered from the perspective of the physical mixed-input device. The haptic feedback component 116 can provide active haptic feedback during different types of interaction contexts via the physical mixed-input device for real input, virtual input and virtual space input.

The virtual mixed-input device 120 supports generating virtual input for the integrated mixed-input system. The virtual mixed-input device 120 operates with the virtual device sensor 132 and the virtual device space tracker 134 to provide the functionality described herein. The virtual device sensor 132 can be a type of sensor transmitting a signal associated with the particular type of sensors. The virtual device sensor 132 can also, in addition or in the alternative, operate as a component that accesses sensor data. Different types of sensor data are contemplated with reference the virtual mixed-input device. The virtual device space tracker 134 can operate with sensor data to determine virtual input. The virtual device space tracker 134 is responsible for identifying and classifying different types of virtual device space information (e.g., hand motion head motion, eye motion, smartphone orientation etc.) which can be communicated as virtual input. Virtual input can refer to information gathered from the perspective of the virtual mixed-input device.

The integrated processing component 140 supports generating virtual space input for the integrated mixed input system. The integrated processing component 140 can receive the real input and virtual input to determine virtual space input for a virtual space input interface. The integrated processing component 140 can further use the real input and virtual input via the interaction context manager 142 to generate different types of interaction contexts as discussed in more detail below. The integrated processing component can access, receive or generate the real input and the virtual input to determine the virtual space input. The integrated processing component 140 operates with the interaction context manager 142 and the interface deviation manager to provide additional functionality of the integrated mixed-input system. The interaction context manager 142 can operate to selectively or automatically generate different types of interaction contexts based on real device space tracker data and virtual device space tracker data. The interface deviation manager 144 can support virtual-based position correction of the virtual space input interface or user-based position correction of the physical mixed-input device interface.

Embodiments described herein can further be described based on exemplary operations performed using components of the integrated mixed-input system 100. For example, the integrated mixed-input space system can support mixed-input virtual space input interface selection via the virtual mixed-input device 120. Real input based on real device space tracker data and virtual input based on virtual device space tracker data can be generated via physical mixed-input device 110 and the virtual mixed-input device respectively. Real device space tracker data and virtual device space tracker data can be associated with different types of interaction contexts that further define the real input and the virtual input that are integrated and processed to generate a virtual space input, where tracker data is determined based at least in part on sensor data. The virtual space input is generated and communicated to control the virtual space input interface. Interface deviation can be supported where the mapping between the physical mixed-input device interface and the virtual space input interface is not mapped in a 1:1 ratio. Virtual-based position correction or user-based position correction may be used during an interface deviation mode. Active haptic feedback can also be generated in different interaction contexts based on real input, virtual input or virtual space input.

Figure 2A:
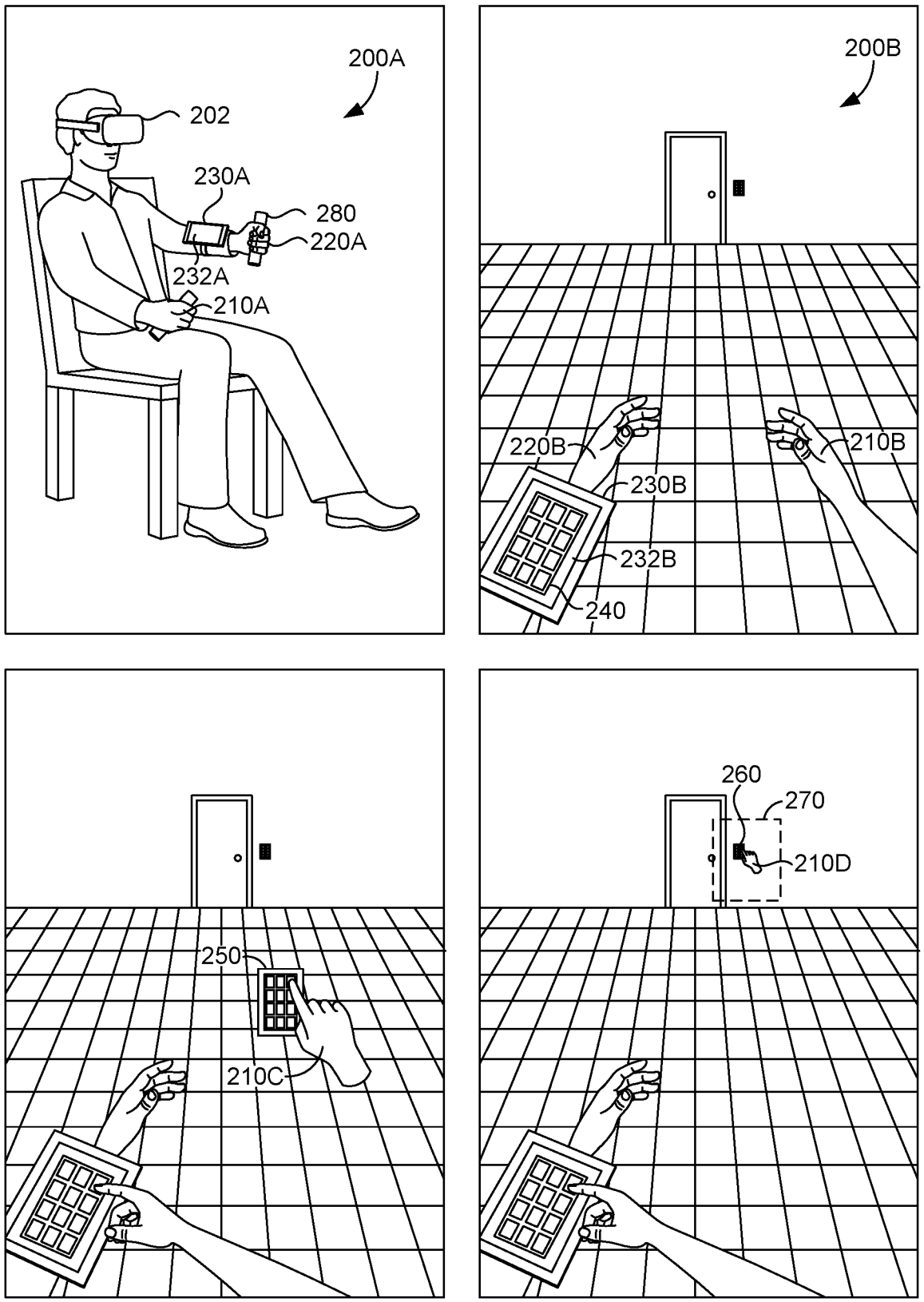
FIGS. 2A and 2B are illustrations of physical elements and virtual elements for interaction contexts of an integrated mixed-input system, in accordance with embodiments of the present invention.
Figure 2B:
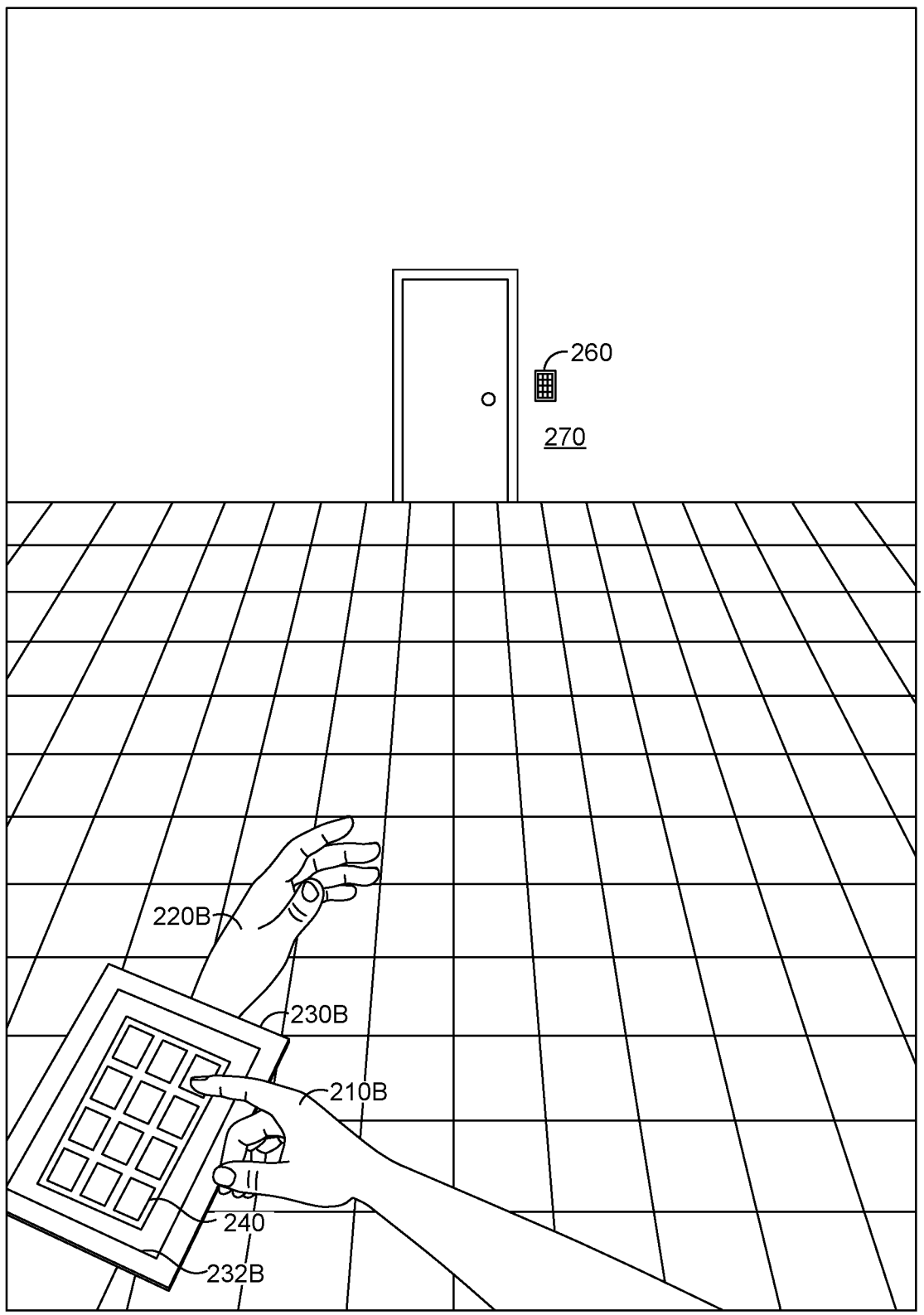

With reference to FIGS. 2A and 2B, FIGS. 2A and 2B illustrate an exemplary integrated mixed-input environment 200 for performing functionality of the integrated mixed-input system 100. The virtual experience can include the following physical elements in real space 200A, a physical first hand 210A, a physical second hand 210B, a physical mixed-input device 230A, a physical mixed-input device interface 232A. The virtual experience can further include the following virtual elements, a virtual first hand 210B, a virtual second hand 220B, a floating virtual first hand 210C, a distant virtual first hand 210D, a virtual representation of the physical mixed-input device 230B, a virtual representation of the physical mixed mixed-input device interface 232B, a regenerated virtual space input interface 240, a floating virtual space input interface 250, a distant virtual space input interface 260 (the regenerated virtual space input interface 240, floating virtual space input interface 250, distant virtual space input interface 260 can be collectively referred to as "virtual space input interface"), and a distant location 270. The different virtual experience elements can be used for different types of interaction contexts with different combinations of the physical elements and virtual elements for generating virtual space input with the integrated mixed-input system. The physical mixed-input device 230A can determine real input based real device space information (e.g., finger motion, display or touchscreen input, physical mixed mixed-input device orientation etc.). The virtual mixed-input device 202 can determine virtual input based virtual device space information (e.g., hand motion, head motion, eye motion, physical mixed mixed-input device orientation etc.).

Figure 3:
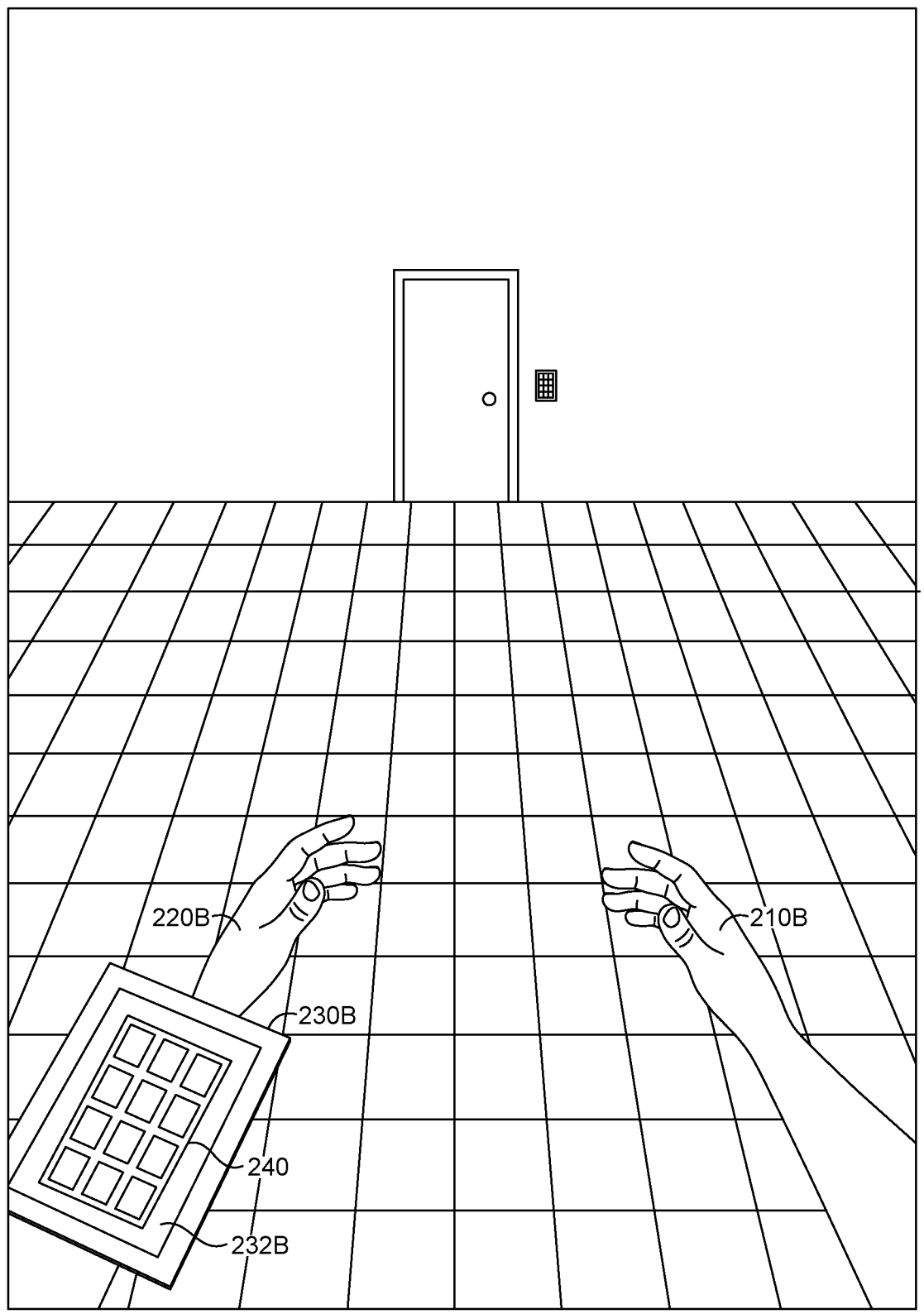
FIG. 3 is an illustration of an exemplary interaction context of an integrated mixed-input system, in accordance with embodiments of the present invention.

With reference to FIG. 3 and real space 200A, FIG. 3 illustrates a first interaction context. The first interaction is directed to rendering the virtual first hand 210B corresponding to the physical first hand 210A (e.g., dominant hand), for receiving input on the physical mixed-input device 230A in real space 200A. The virtual first hand 210B is rendered when the physical first hand 210A is in a position proximate to the physical mixed-input device 230A, the physical mixed-input device 230A is coupled to the physical second hand 220A. A position of the virtual first hand 210B can correspond to a position of the physical first hand 210A and a position of the virtual second hand 220B can correspond to a position of the physical second hand 220A.

Figure 4:
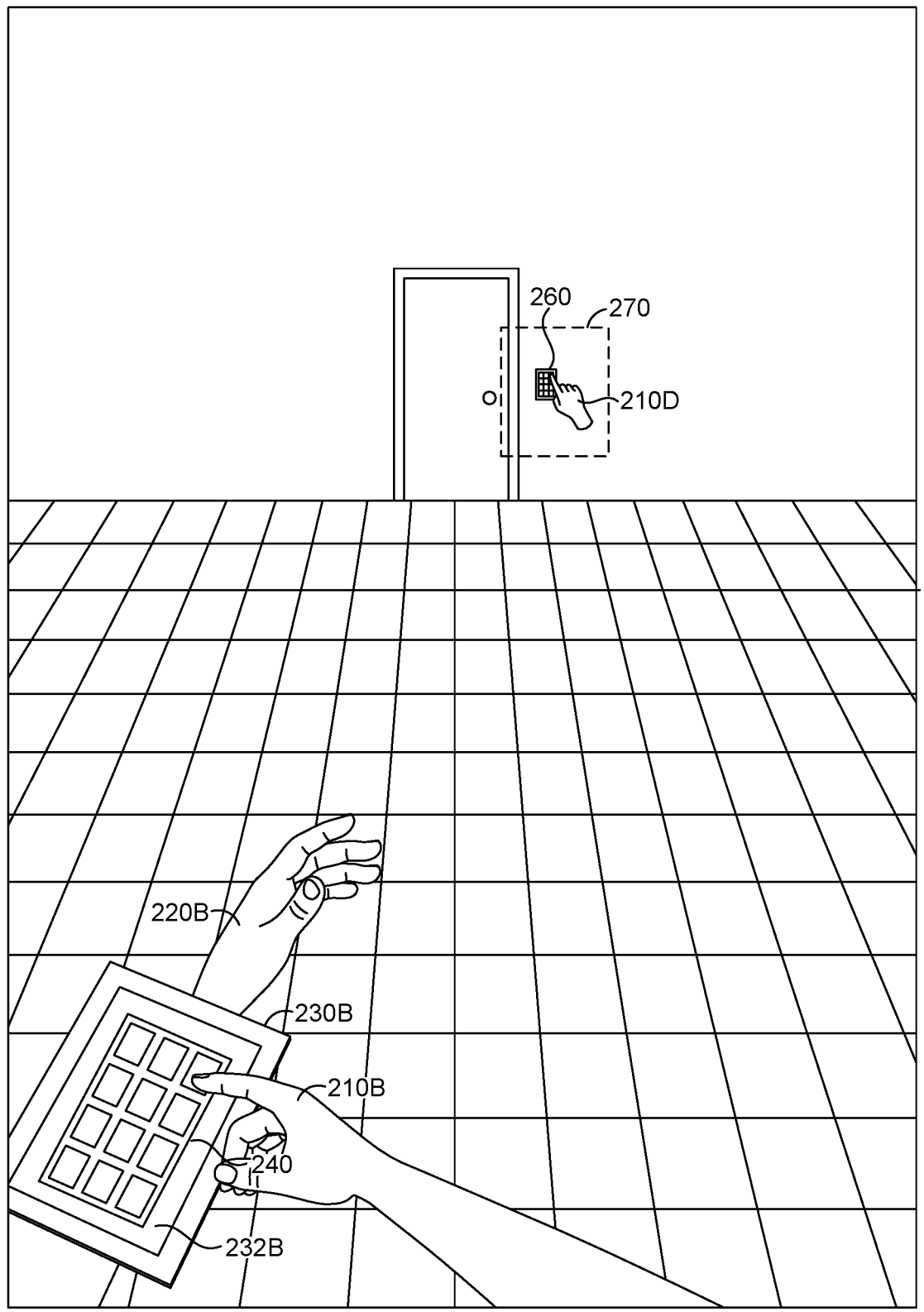
FIG. 4 is an illustration of an exemplary interaction context of an integrated mixed-input system, in accordance with embodiments of the present invention.

With reference to FIG. 4 and real space 200A, FIG. 4 illustrates a second interaction context. The second interaction is directed to rendering the distant virtual first hand 210D corresponding to the physical first hand 210A (e.g., dominant hand), for receiving input on the physical mixed-input device 230A in real space 200A. The distant virtual first hand 210D is generated at the distant location 270 or generated and redirected to the distant location 270 in the virtual space 200B. The distant virtual first hand 210D is rendered when the physical first hand 210A is in a position proximate to the physical mixed-input device 230A, the physical mixed-input device 230A is coupled to the physical second hand 220A in real space 200A. The distant virtual first hand can be generated or redirected next to a selected (e.g., gaze selection via the HMD) virtual space input interface (e.g., distant virtual space input interface 260) for receiving input with reference to the virtual space input interface.

Figure 5:
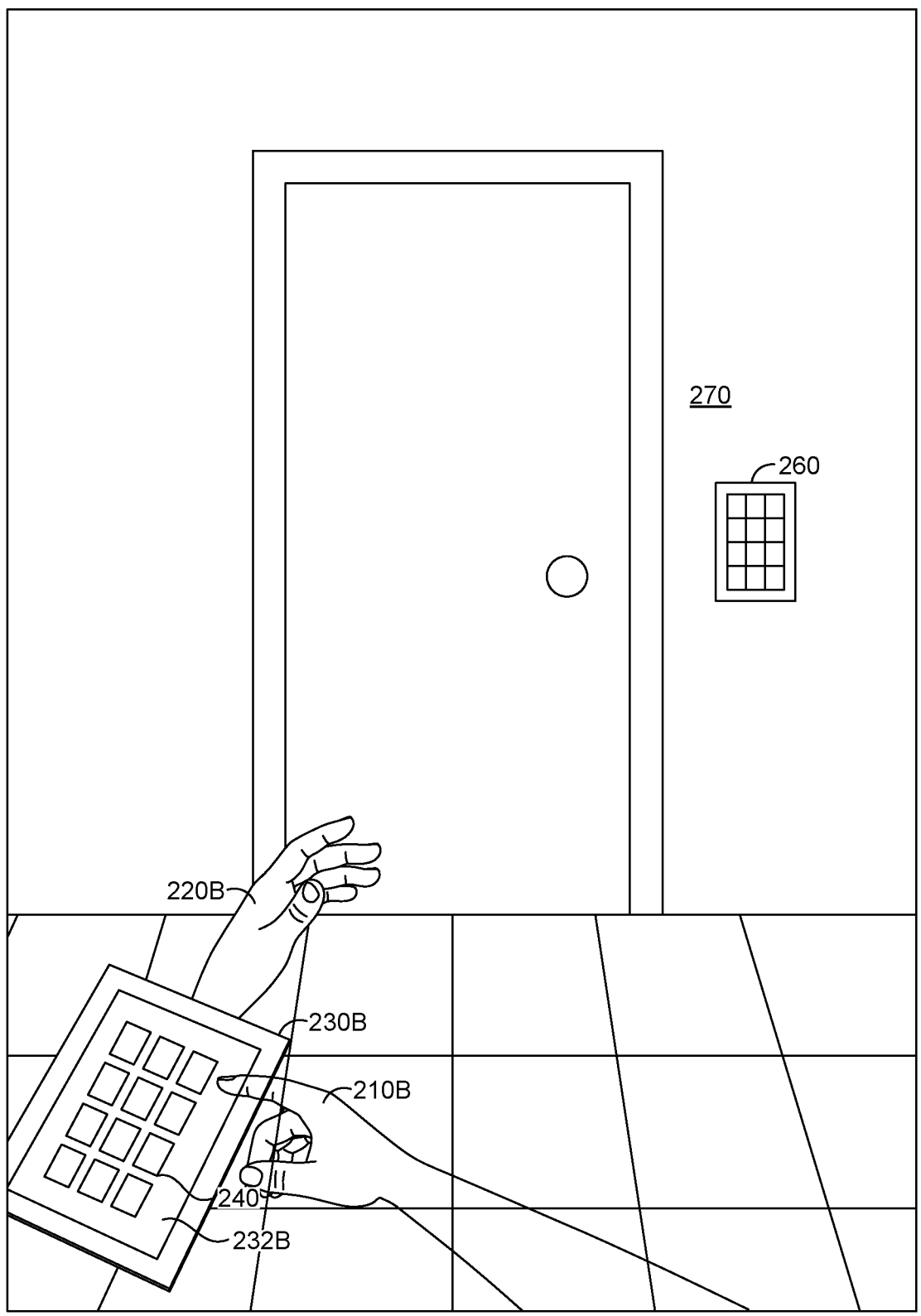
FIG. 5 is an illustration of an exemplary interaction context of an integrated mixed-input system, in accordance with embodiments of the present invention.

With reference to FIG. 5 and real space 200A, FIG. 5 illustrates a third interaction context. The third interaction is directed to rendering a virtual representation of the physical mixed-input device interface 232B of virtual representation of the physical mixed-input device 230B coupled to virtual second hand corresponding to the physical second hand 220A (e.g., non-dominant hand), for receiving input on the physical mixed-input device 230 in real space 200A. The virtual second hand 220B, having at least the virtual representation of the physical mixed-input device 230B, the virtual representation of the physical mixed mixed-input device interface 232B, or a regenerated virtual space input interface 240 is generated when a position of a physical second hand 220A that corresponds to a position of the virtual second hand 220B as shown, that is, the position of the virtual second hand 220B is proximate to a selected virtual space input interface (e.g., distant virtual space input interface 260). For example, a user can walk up to a virtual keypad—distant virtual space input 260 at the distant location 270. It is contemplated that the rendering of the virtual representation of the physical mixed-input device interface 230B in virtual space automatically can change to the virtual keypad (i.e., regenerated virtual space input interface 240). The virtual representation of the physical mixed-input device 230B, the virtual representation of the physical mixed mixed-input device interface 232B can be used to for receiving input, via the physical first hand 210A in real space.

Figure 6:
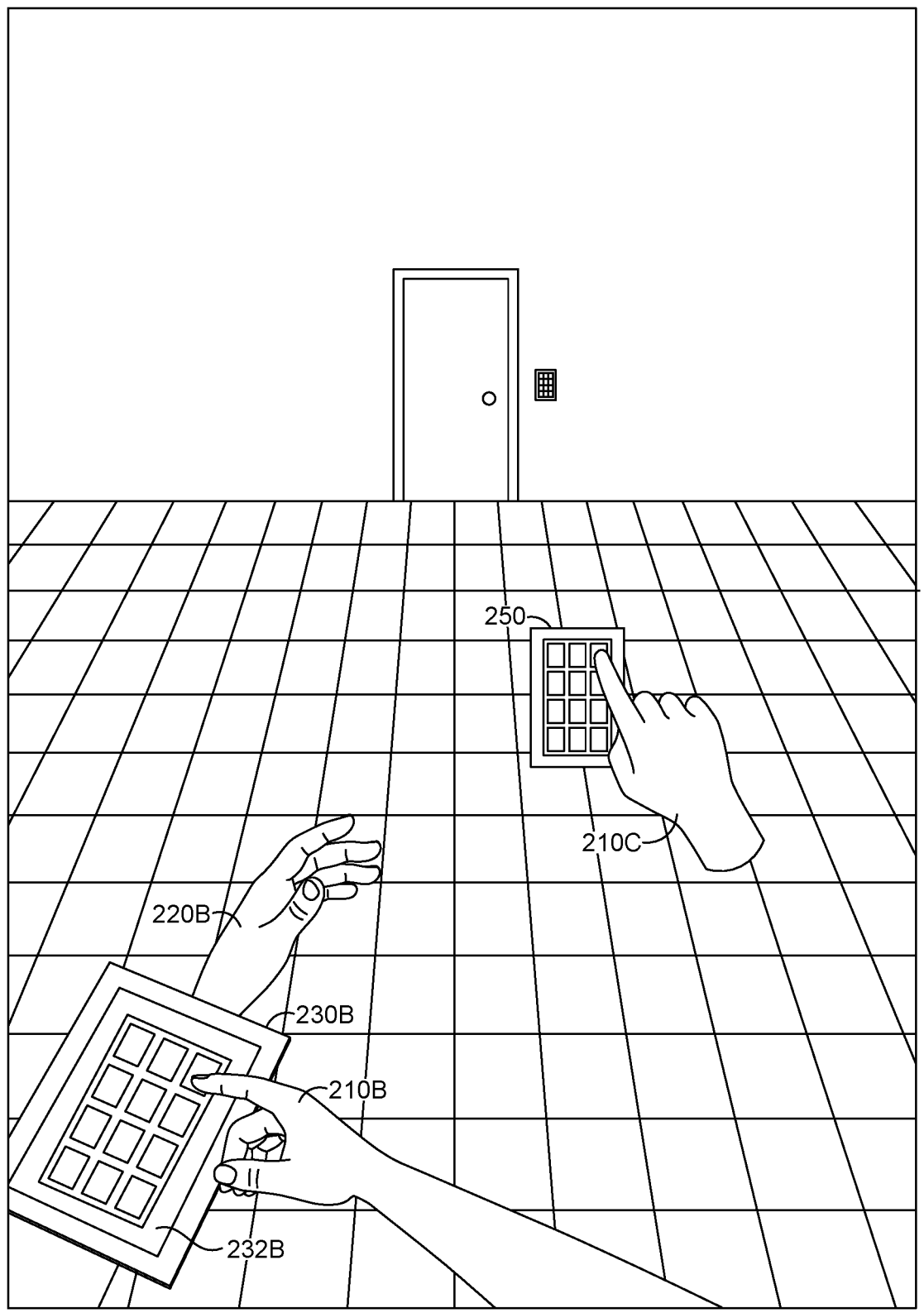
FIG. 6 is an illustration of an exemplary interaction context of an integrated mixed-input system, in accordance with embodiments of the present invention.

With reference to FIG. 6 and real space 200A, FIG. 6 illustrates a fourth interaction context, the fourth interaction is directed to rendering the a floating virtual space input interface 250 and a floating virtual first hand 210C (optional) corresponding to a physical first hand 210A (e.g., dominant hand), for receiving input on the physical mixed-input device 230A in real space 200A. The floating virtual space input interface 250 is rendered when a selection is received (e.g., gaze-based selection) for a virtual space input interface, and the physical first hand 210A is moved to a position proximate to the physical mixed-input device 230A, where the physical mixed-input device 230A is coupled to the physical first hand 220A in real space 200A. The floating virtual first hand 210C can be used for receiving input, via the physical first hand 210A in real space 200A.

Figure 7:
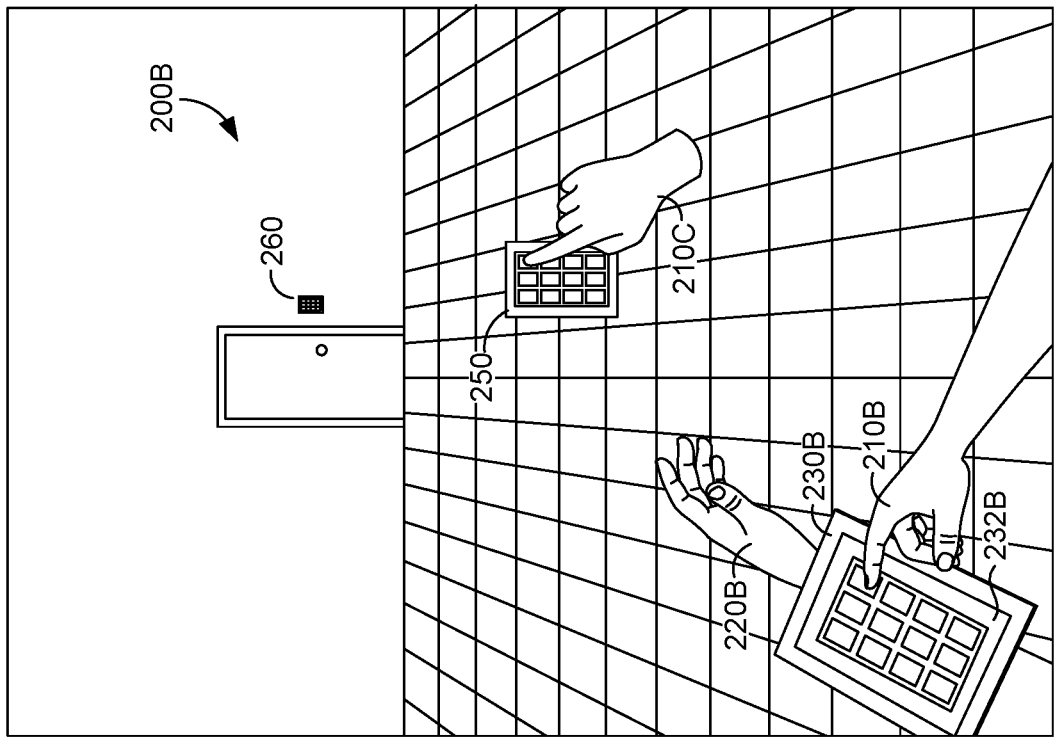
FIG. 7 is an illustration of an exemplary interface deviation for integrated mixed-input system, in accordance with embodiments of the present invention.
Figure 7:
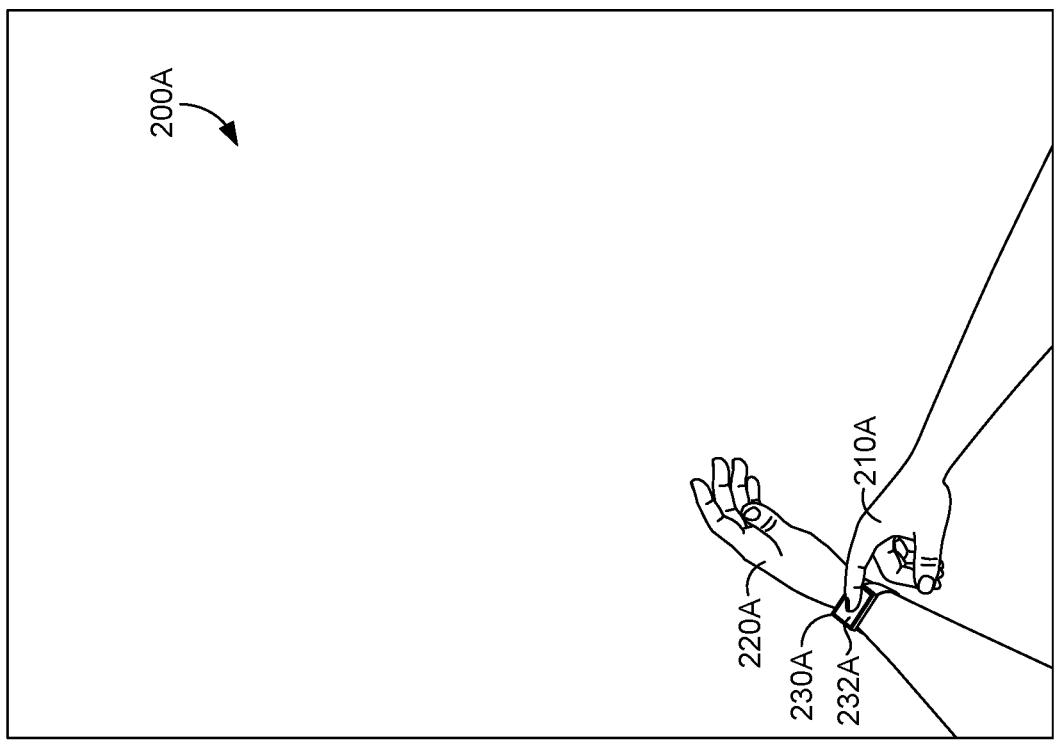

With reference to FIG. 7, FIG. 7 illustrates an interface deviation interaction context. The interface deviation interaction is directed to rendering a virtual space input interface (e.g., a regenerated virtual space input interface 240, a floating virtual space input interface 250, a distant virtual space input interface 260 with a virtual space input interface size that is larger than the physical mixed-input device interface size (e.g., physical mixed-input device interface 232A). As discussed, the integrated mixed-input system supports interface deviation where a physical mixed-input device interface is a different size from a size of the virtual space input interface. For example, a physical mixed-input device interface of the physical mixed-input device has a first interface size which is smaller than a second interface size; the virtual space input interface of the virtual mixed-input device has the second interface size which is larger. The virtual space input interface is dynamically shifted, such that, a target input portion of the virtual space input interface overlaps with the physical mixed-input device interface to receive the real input. Alternatively, the user can dynamically shift the physical mixed-input device interface, such that, the target input portion of the virtual space input interface overlaps with the physical mixed-input device interface to receive the real input.

Figure 8:
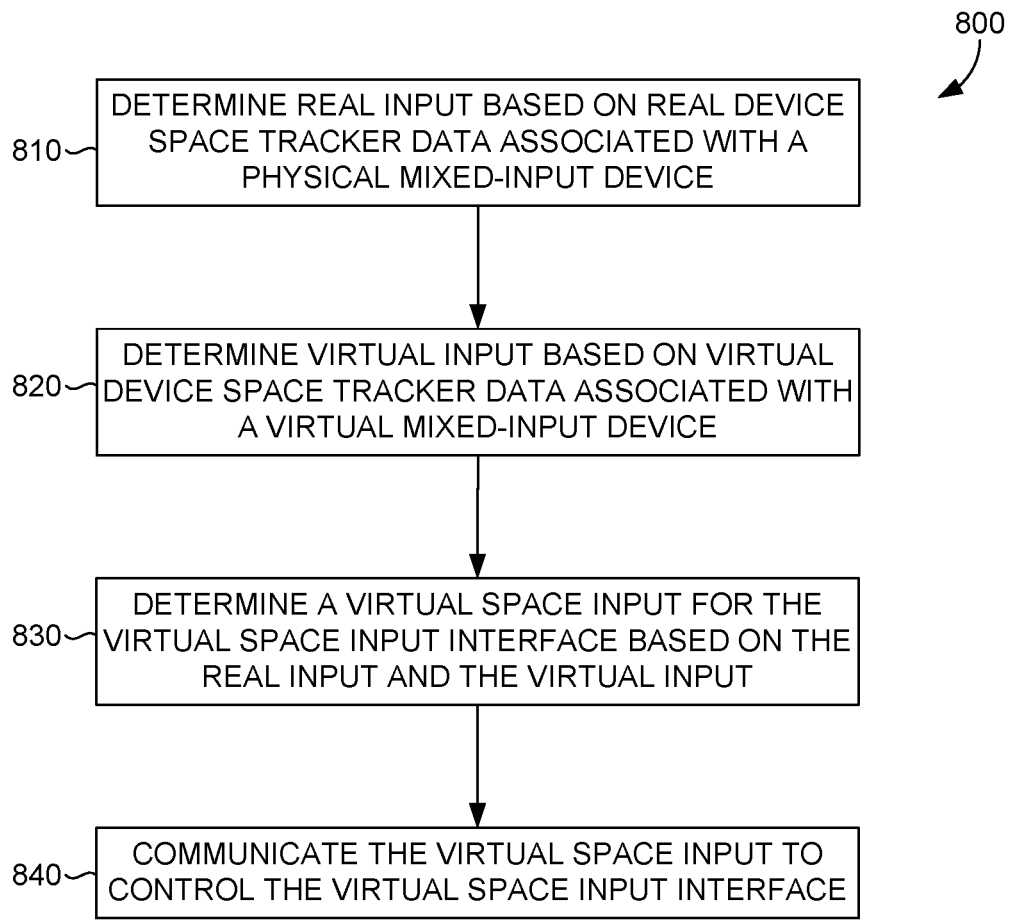
FIG. 8 is a flow diagram showing a method for implementing an integrated mixed-input system, in accordance with embodiments of the present invention.
Figure 9:
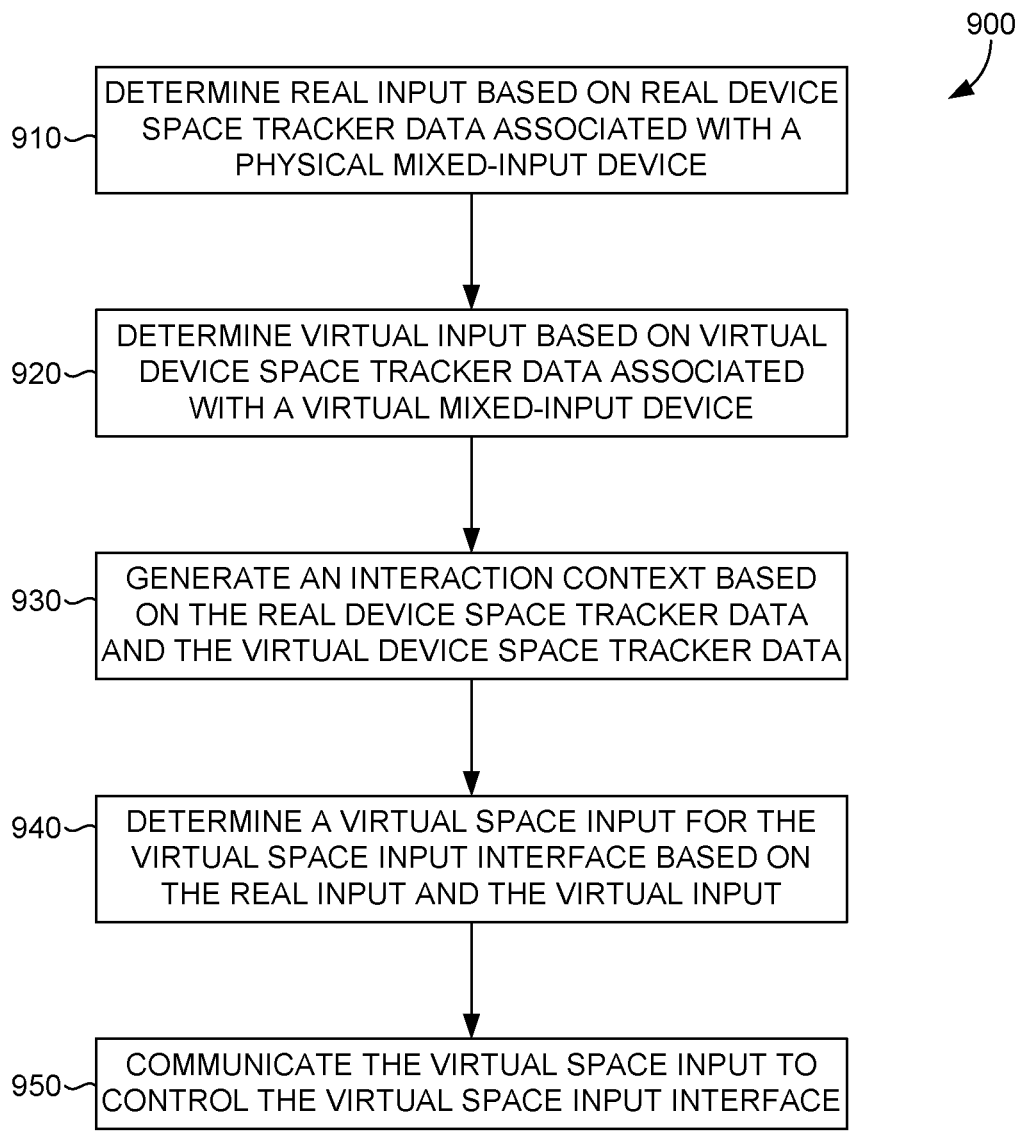
FIG. 9 is a flow diagram showing a method for implementing an integrated mixed-input system, in accordance with embodiments of the present invention.

With reference to FIGS. 8 and 9, flow diagrams are provided illustrating methods for implementing integrated mixed-input systems. The methods can be performed using the integrated mixed-input system described herein. In embodiments, one or more computer storage media having computer-executable instructions embodied thereon that, when executed, by one or more processors, can cause the one or more processors to perform the methods in the integrated mixed-input system. The integrated mixed-input systems 100 includes, amongst other components, a physical mixed-input device 110, a virtual mixed-input device 120, a virtual mixed-input component 130 and an integrated processing component 140.

Turning to FIG. 8, a flow diagram is provided that illustrates a method 800 for implementing integrated mixed-input systems. Initially at block 810, real input is determined based on real device space tracker data associated with a physical mixed-input device. At block 820, virtual input is determined based on virtual device space tracker data associated with a virtual mixed-input device. A physical mixed-input device interface of the physical mixed-input device has a first interface size which is smaller than a second interface size, and a virtual space input interface has the second interface size which is larger. The virtual space input interface is dynamically shifted, such that, a target input portion of the virtual space input interface overlaps with the physical mixed-input device interface to receive the real input. At block 830, a virtual space input is determined for the virtual space input interface based on the real input and the virtual input in an interaction context. At block 840, the virtual space input is communicated to control the virtual space input interface.

Turning to FIG. 9, a flow diagram is provided that illustrates a method 900 for implementing integrated mixed-input systems. Initially, at block 910, real input is determined based on real device space tracker data associated with a physical mixed-input device. At block 920, virtual input is determined based on virtual device space tracker data associated with a virtual mixed-input device. At block 930, an interaction context is generated based on the real device space tracker data and the virtual device space tracker data for a virtual space input interface. At block 940, a virtual space input is determined for the virtual space input interface based on the real input and the virtual input context. At block 950, the virtual space input is communicated to control the virtual space input interface.

Figure 10:
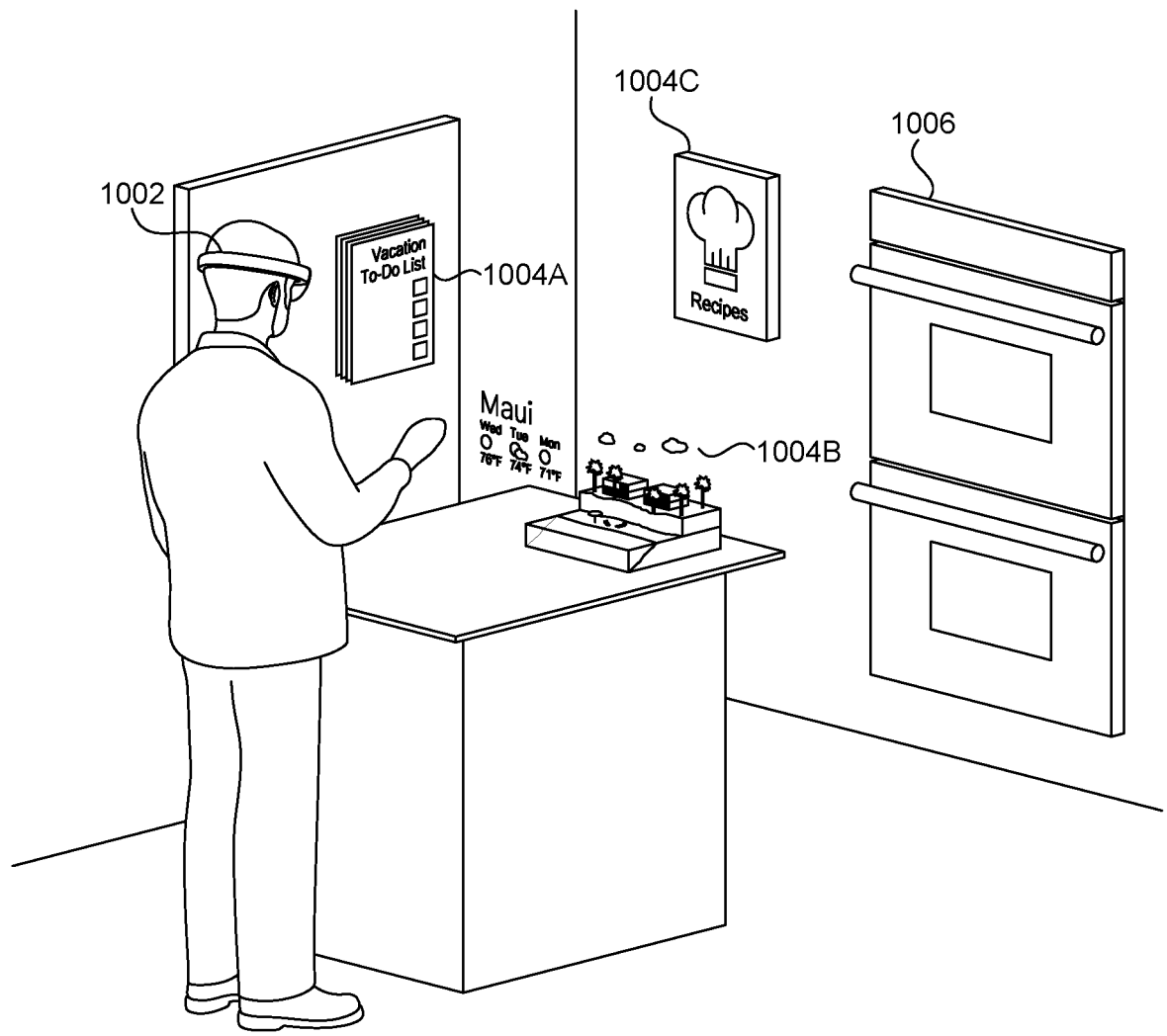
FIG. 10 is an illustrated diagram showing exemplary augmented reality images of a head-mounted display device, in accordance with embodiments of the present invention.

With reference to FIG. 10, exemplary images of a head-mounted display (HMD) device 1002 are depicted. Augmented reality images (e.g., 1004A, 1004B and 1004C), comprising corresponding virtual images provided by the HMD 1002 device, generally include the virtual images that appear superimposed on a background and may appear to interact with or be integral with the background 1006. The background 1006 is comprised of real-world scene, e.g., a scene that a user would perceive without augmented reality image emitted by the HMD 1002 device. For example, an augmented reality image can include the recipe book icon 1004C that appears superimposed and hanging in mid-air in front of the cooking oven or wall of the background 1006.

Figure 11:
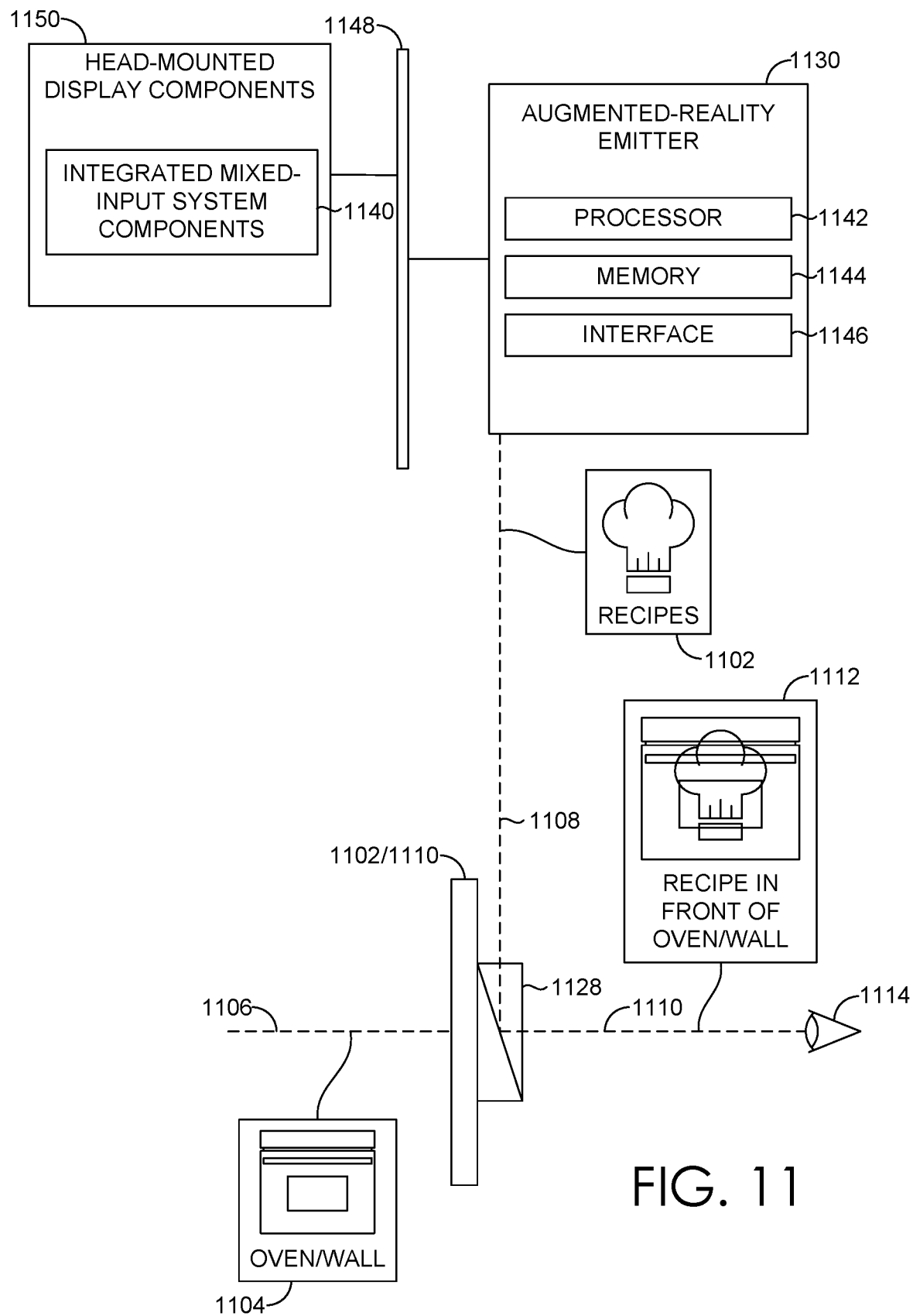
FIG. 11 is a block diagram of an exemplary head-mounted display device, in accordance with embodiments of the present invention.

Turning to FIG. 11, the HMD device 1102 having the integrated mixed-input system components 1140 is described in accordance with an embodiment described herein. The HMD device 1102 includes a see-through lens 1110 which is placed in front of a user's eye 1114, similar to an eyeglass lens. It is contemplated that a pair of see-through lenses 1110 can be provided, one for each eye 1114. The lens 1110 includes an optical display component 1128, such as a beam splitter (e.g., a half-silvered mirror). The HMD device 1102 includes an augmented reality emitter 1130 that facilitates projecting or rendering the of augmented reality images. Amongst other components not shown, the HMD device also includes a processor 1142, memory 1144, interface 1146, a bus 1148, and additional HMD components 1150. The augmented reality emitter 1130 emits light representing a virtual image 1102 exemplified by a light ray 1108. Light from the real-world scene 1104, such as a light ray 1106, reaches the lens 1110. Additional optics can be used to refocus the virtual image 1102 so that it appears to originate from several feet away from the eye 1114 rather than one inch away, where the display component 1128 actually is. The memory 1144 can contain instructions which are executed by the processor 1142 to enable the augmented reality emitter 1130 to perform functions as described. One or more of the processors can be considered to be control circuits. The augmented reality emitter communicates with the additional HMD components 1150 using the bus 1148 and other suitable communication paths.

Light ray representing the virtual image 1102 is reflected by the display component 1128 toward a user's eye, as exemplified by a light ray 1110, so that the user sees an image 1112. In the augmented-reality image 1112, a portion of the real-world scene 1104, such as, a cooking oven is visible along with the entire virtual image 1102 such as a recipe book icon. The user can therefore see a mixed-reality or augmented-reality image 1112 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 12:
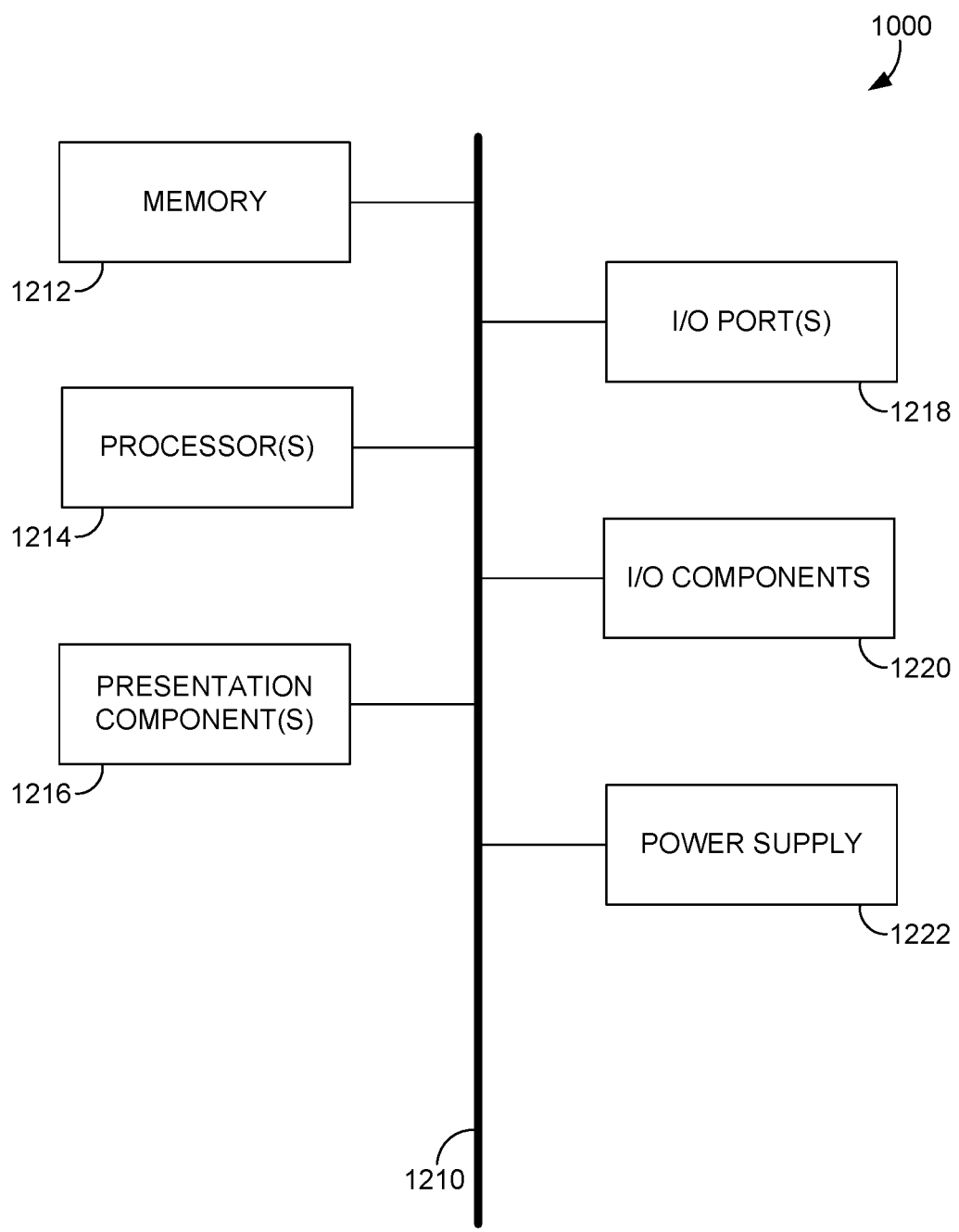
FIG. 12 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes a bus 1210 that directly or indirectly couples the following devices: memory 1212, one or more processors 1214, one or more presentation components 1216, input/output ports 1218, input/output components 1220, and an illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the integrated mixed-input system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, cause the one or more processors to perform a method for implementing integrating mixed-input systems, the method comprising:
   determining real input based on real device space tracker data associated with a physical mixed-input device;
   determining virtual input based on virtual device space tracker data associated with a virtual mixed-input device;
   generating an interaction context from a predefined set of two or more interaction contexts, wherein the predefined set of two or more interaction contexts are virtual experiences, wherein the predefined set of two or more interaction contexts are virtual experiences that support dynamic virtual-based position correction of virtual space input interfaces;
   wherein a first predefined interaction context comprises temporarily rescaling the virtual space input interface upon determining a size difference between a virtual input space interface and a physical mixed-input device interface;
   wherein the interaction context is generated based on the real device space tracker data and the virtual device space tracker data for a virtual space input interface;
   integrating the real device space tracker data and the virtual device space tracker data to determine a virtual space input for the virtual space input interface based on the real input and the virtual input in the interaction context; and
   communicating the virtual space input to control the virtual space input interface.

2. The media of claim 1, wherein the physical mixed-input device is a mobile device having a display that displays the physical mixed-input device interface and wherein the virtual mixed-input device is a head-mounted display that displays the virtual space input interface; and wherein the physical mixed-input device and the virtual mixed-input device are paired for determining the virtual space input for the virtual space input interface displayed via the virtual mixed-input device.

3. The media of claim 1, further comprising executing an interface deviation operation for the virtual space input interface, wherein a physical mixed-input device interface comprises a first interface size which is different from a second interface size, wherein the virtual input space interface has the second size,
   wherein the first interface size is smaller than the second interface size, such that, the interface deviation operation comprises dynamically shifting the virtual space input interface, such that, a target input portion of the virtual space input interface overlaps with the physical mixed-input input device interface; or
   wherein the first interface size is larger than the second interface size, such that, the interface deviation operation comprises receiving the real input based on the physical mixed-input device interface being dynamically shifted, such that, a target input portion of the virtual space input interface overlaps with the physical mixed-input input device interface.

4. The media of claim 1, wherein the predefined set of interaction contexts are defined based on combinations of physical elements and virtual elements, wherein the physical elements comprise a physical first hand and a physical second hand associated with proximity and motion data; and
   wherein the virtual elements comprising a virtual first hand, a virtual second hand, a floating virtual first hand, a distant virtual first hand, a virtual representation of the physical mixed-input device, a virtual presentation of the device interface, a regenerated virtual space input interface, a floating virtual space input interface, and a distance virtual space input interface.

5. The media of claim 1, wherein the real input on the physical mixed-input device via a target input portion of the virtual space input interface causes at least the physical mixed-input device to generated haptic feedback.

6. The media of claim 1, wherein the real input and the virtual input captured via corresponding real device sensors and virtual device sensors are integrated and processed in combination to determine the virtual space input for the virtual space input interface.

7. The media of claim 1, wherein different combinations of real input and virtual input trigger corresponding interaction contexts including each of the following:
   a first interaction context comprising rendering a virtual representation of the physical mixed-input device coupled to a virtual second hand corresponding to a physical second hand coupled to the physical mixed-input device to receive input on the physical mixed-input device;
   a second interaction context comprising rendering the virtual representation of the physical mixed-input device coupled to the virtual second hand and a distant virtual first hand corresponding to a physical first hand to receive input on the physical mixed-input device;
   a third interaction context comprising rendering a virtual representation of the physical mixed-input device interface on the virtual representation of the physical mixed-input device on the virtual second hand corresponding to the physical second hand to receive input on the physical mixed-input device; and
   a fourth interaction context comprising rendering the virtual representation of the physical mixed-input device coupled to the virtual second hand and a floating virtual space input interface and a floating virtual first hand corresponding to the physical first hand to receive input on the physical mixed-input device.

8. An integrated mixed-input system comprising:
   a physical mixed-input device configured to:
   determine real input based on real device space tracker data associated with the physical mixed-input device, wherein the physical mixed-input device is a mobile device having a display that displays the physical mixed-input device interface;
a virtual mixed-input device configured to:
determine virtual input based on virtual device space tracker data associated with the virtual mixed-input device, wherein the virtual mixed-input device is a head-mounted display that displays the virtual space input interface;
an integrated processing component to:
generate an interaction context from a predefined set of two or more interaction contexts, wherein the predefined set of two or more interaction contexts are virtual experiences, wherein the predefined set of two or more interaction contexts are virtual experiences that support dynamic virtual-based position correction of virtual space input interfaces;
wherein a first predefined interaction context comprises temporarily rescaling the virtual space input interface upon determining a size difference between a virtual input space interface and a physical mixed-input device interface;
wherein the interaction context is generated based on the real device space tracker data and the virtual device space tracker data for the virtual space input interface;
integrate the real device space tracker data and the virtual device space tracker data to determine the virtual space input based on the real input and the virtual input in the interaction context; and
communicate the virtual space input to control the virtual space input interface.

9. The system of claim 8, wherein the physical mixed-input device is a mobile device having a display that displays the physical mixed-input device interface, the mobile device operates an application the receives and processes the real input, and wherein the virtual mixed-input device is a head-mounted display that displays the virtual space input interface, the head-mounted display support gaze selection for receiving and processing virtual input.

10. The system of claim 8, further comprising a hover sensor configured to detect proximity or motion data of external objects to the physical mixed-input device to receive real input or determine the virtual space input to cause navigation through different sets of characters available via the physical mixed-input device or the virtual mixed-input device.

11. The system of claim 8, further comprising an interface deviation manager configured to execute interface deviation for the virtual space input interface, the interface deviation comprising temporarily rescaling the virtual space input interface to match a physical mixed-input device interface.

12. The system of claim 8, further comprising an interface deviation manager configured to execute interface deviation for the virtual space input interface, wherein the physical mixed-input device interface comprises a first interface size which is different from a second interface, wherein the virtual space input interface has the second size;
wherein the first interface size is smaller than the second interface size, such that, interface deviation comprises dynamically shifting the virtual space input interface, such that, a target input portion of the virtual space input interface overlaps with the physical mixed-input input device interface; or
wherein the first interface size is larger than the second interface size, such that, interface deviation comprises receiving the real input based on the physical mixed-input device interface being dynamically shifted, such that, a target input portion of the virtual space input interface overlaps with the physical mixed-input input device interface.

13. The system of claim 8, further comprising a haptic feedback component configured to generate haptic feedback on the physical mixed-input device and the virtual mixed-input device based on receiving real input on the physical mixed-input device.

14. The system of claim 8, wherein the integrated processing component is further to identify different combinations of real input and virtual input to trigger corresponding interaction contexts including each of the following:
a first interaction context comprising rendering a virtual representation of the physical mixed-input device coupled to a virtual second hand corresponding to a physical second hand coupled to the physical mixed-input device to receive input on the physical mixed-input device;
a second interaction context comprising rendering the virtual representation of the physical mixed-input device coupled to the virtual second hand and a distant virtual first hand corresponding to a physical first hand to receive input on the physical mixed-input device;
a third interaction context comprising rendering a virtual representation of the physical mixed-input device interface on the virtual representation of the physical mixed-input device on the virtual second hand corresponding to the physical second hand to receive input on the physical mixed-input device; and
a fourth interaction context comprising rendering the virtual representation of the physical mixed-input device coupled to the virtual second hand and a floating virtual space input interface and a floating virtual first hand corresponding to the physical first hand to receive input on the physical mixed-input device.

15. A computer-implemented method for implementing integrating mixed-input systems, the method comprising:
determining real input based on real device space tracker data associated with a physical mixed-input device;
determining virtual input based on virtual device space tracker data associated with a virtual mixed-input device;
generating an interaction context from a predefined set of two or more interaction contexts, wherein the predefined set of two or more interaction contexts are virtual experiences, wherein the predefined set of two or more interaction contexts are virtual experiences that support dynamic virtual-based position correction of virtual space input interfaces;
wherein a first predefined interaction context comprises temporarily rescaling the virtual space input interface upon determining a size difference between a virtual input space interface and a physical mixed-input device interface;
wherein the interaction context is generated based on the real device space tracker data and the virtual device space tracker data for a virtual space input interface,
integrating the real device space tracker data and the virtual device space tracker data to determine the virtual space input for the virtual space input interface based on the real input and the virtual input via the interaction context; and
communicating the virtual space input to control the virtual space input interface.

16. The method of claim 15, wherein the physical mixed-input device is a mobile device having a display that displays a physical mixed-input device interface and wherein the virtual mixed-input device is a head-mounted display that displays the virtual space input interface, wherein the physical mixed-input device and the virtual mixed-input device are paired for determining the virtual space input for the virtual space input interface displayed via the virtual mixed-input device.

17. The method of claim 15, further comprising executing an interface deviation operation for the virtual space input interface, wherein a physical mixed-input device interface comprises a first interface size which is different from a second interface size, wherein the virtual input space interface has the second size.

18. The method of claim 15, wherein the first interface size is smaller than the second interface size, such that, the interface deviation operation comprises dynamically shifting the virtual space input interface, such that, a target input portion of the virtual space input interface overlaps with the physical mixed-input input device interface; or wherein the first interface size is larger than the second interface size, such that, the interface deviation operation comprises receiving the real input based on the physical mixed-input device interface being dynamically shifted, such that, a target input portion of the virtual space input interface overlaps with the physical mixed-input input device interface.

19. The method of claim 15, further comprising detecting proximity or motion data of external objects to the physical mixed-input device to predict an intent of the user to supplement generating the interaction context.

20. The method of claim 15, wherein different combination of real input and virtual input trigger corresponding interaction contexts including each of the following:
  a first interaction context comprising rendering a virtual representation of the physical mixed-input device coupled to a virtual second hand corresponding to a physical second hand coupled to the physical mixed-input device to receive input on the physical mixed-input device;
  a second interaction context comprising rendering the virtual representation of the physical mixed-input device coupled to the virtual second hand and a distant virtual first hand corresponding to a physical first hand to receive input on the physical mixed-input device;
  a third interaction context comprising rendering a virtual representation of the physical mixed-input device interface on the virtual representation of the physical mixed-input device on the virtual second hand corresponding to the physical second hand to receive input on the physical mixed-input device; and
  a fourth interaction context comprising rendering the virtual representation of the physical mixed-input device coupled to the virtual second hand; and
  a floating virtual space input interface and a floating virtual first hand corresponding to the physical first hand to receive input on the physical mixed-input device.

* * * * *